Figure 1:
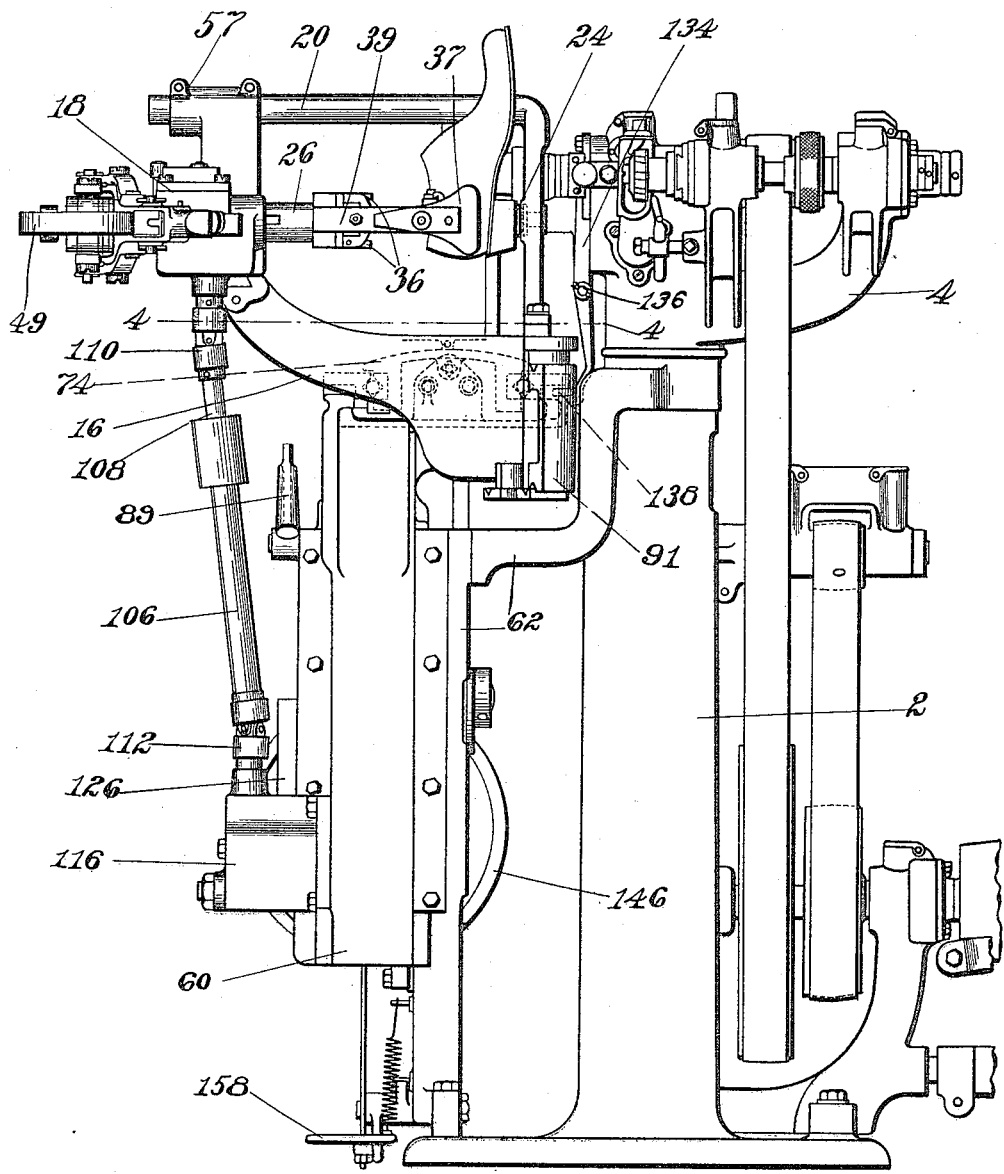

F. W. BLANCHARD.
MACHINE FOR USE IN FINISHING SHOES.
APPLICATION FILED FEB. 28, 1914.

1,214,266.

Patented Jan. 30, 1917.
5 SHEETS—SHEET 4.

WITNESSES.
Elizabeth C. Coupe
O. Blanche Hargraves

INVENTOR.
Frank W. Blanchard
By his Attorney
Nelson W. Howard

F. W. BLANCHARD.
MACHINE FOR USE IN FINISHING SHOES.
APPLICATION FILED FEB. 28, 1914.

1,214,266.

Patented Jan. 30, 1917.

WITNESSES.
Elizabeth C. Coufe
O. Blanche Hargraves

INVENTOR.
Frank W. Blanchard
By his Attorney,
Nelson W. Howard

UNITED STATES PATENT OFFICE.

FRANK W. BLANCHARD, OF LYNN, MASSACHUSETTS, ASSIGNOR TO UNITED SHOE MACHINERY COMPANY, OF PATERSON, NEW JERSEY, A CORPORATION OF NEW JERSEY.

MACHINE FOR USE IN FINISHING SHOES.

1,214,266.

Specification of Letters Patent.

Patented Jan. 30, 1917.

Application filed February 28, 1914. Serial No. 821,660.

*To all whom it may concern:*

Be it known that I, FRANK W. BLANCHARD, a citizen of the United States, residing at Lynn, in the county of Essex and State of Massachusetts, have invented certain Improvements in Machines for Use in Finishing Shoes, of which the following description, in connection with the accompanying drawings, is a specification, like reference characters on the drawings indicating like parts in the several figures.

This invention relates to machines for performing the finishing operations on the bottoms of boots and shoes.

More specifically it relates to automatic machines for trimming the heels of shoes.

While machines of a semi-automatic type were in very common use for performing the trimming operation on heels about thirty years ago, these machines have, except in rare instances, been displaced by machines in which the shoe is manipulated entirely by hand. This change has taken place largely for the reason that the trimming operation can be performed much more rapidly on the later machines, which do not require the jacking of the shoe, than on the earlier machines, which do require the jacking operation; and because the attachment of a templet or pattern plate to the top lift of the heel, which was always required in the earlier machines, disfigured the top lift, whereas this disfigurement was avoided in the later machines. In the machines now used almost universally the shoe is held for the trimming operation in the hands of the workman and is positioned relatively to the cutter by guides that engage respectively the counter and top lift of the shoe and aid the workman in manipulating the shoe, the top lift serving the purposes of the templet which formerly was attached to the heel for the trimming operation. This hand trimming operation, however, is one that requires great skill on the part of the workman and consequently is comparatively expensive.

It is an important object of the present invention to devise a heel trimming machine which shall be so organized that it will perform the trimming operations on the heel with entire satisfaction and without defacing any part of the shoe and yet shall not require any particular degree of skill on the part of the workman in its operation.

More specifically the invention aims to devise a machine that will effect automatically the relative movements of a heel and cutter necessary to cause the cutter to trim the entire heel edge from one breast corner around the rear end of the heel to the opposite breast corner while utilizing the counter and top lift of the shoe as guides for the trimming operation. By this arrangement it is proposed to guide the shoe substantially as it is guided by hand and, therefore, to obtain at least as good results as are obtained by hand while eliminating the skill that is necessary in order to guide the shoe properly by hand.

The invention has for further objects to devise a machine of the character indicated which shall have provision for accommodating heels of different sizes and styles, which shall permit the ready insertion and removal of the work, and which generally shall meet the requirements essential for a practical heel trimming machine.

The manner in which it is proposed to accomplish these objects and effect these results will be clearly understood from the following description of one embodiment of the invention and the novel features will be pointed out in the appended claims.

Figure 2:
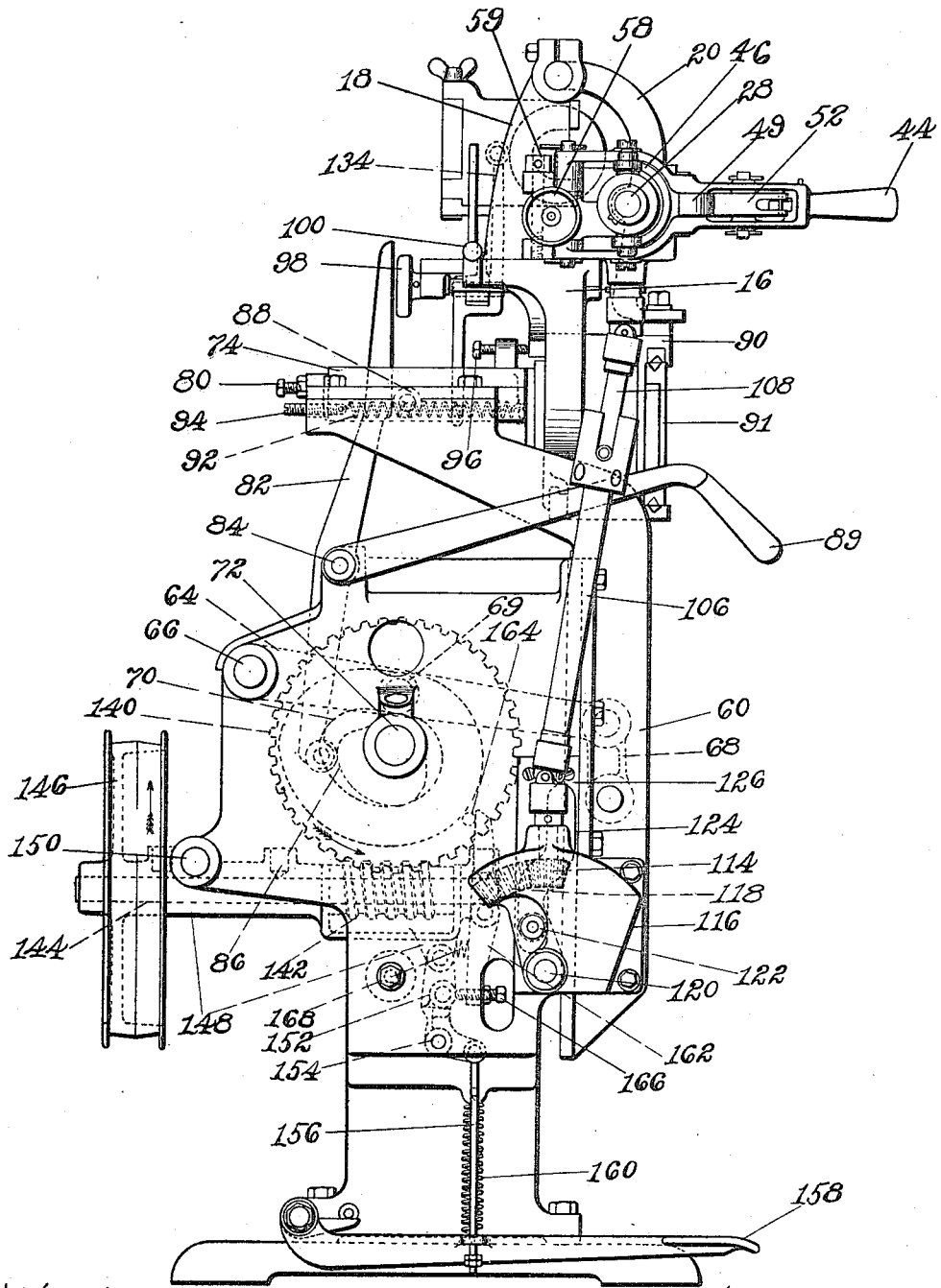
Figure 3:
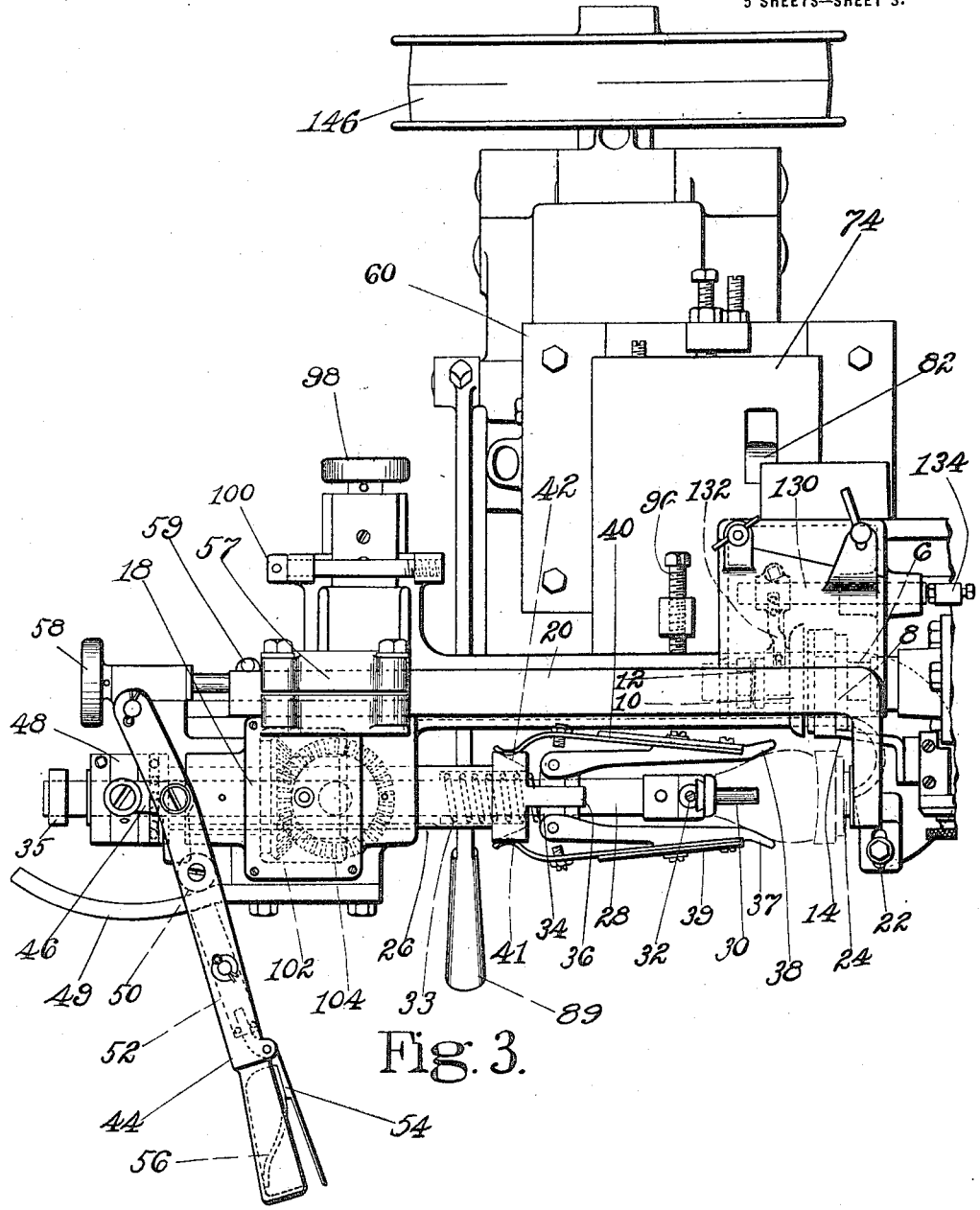
Figure 5:
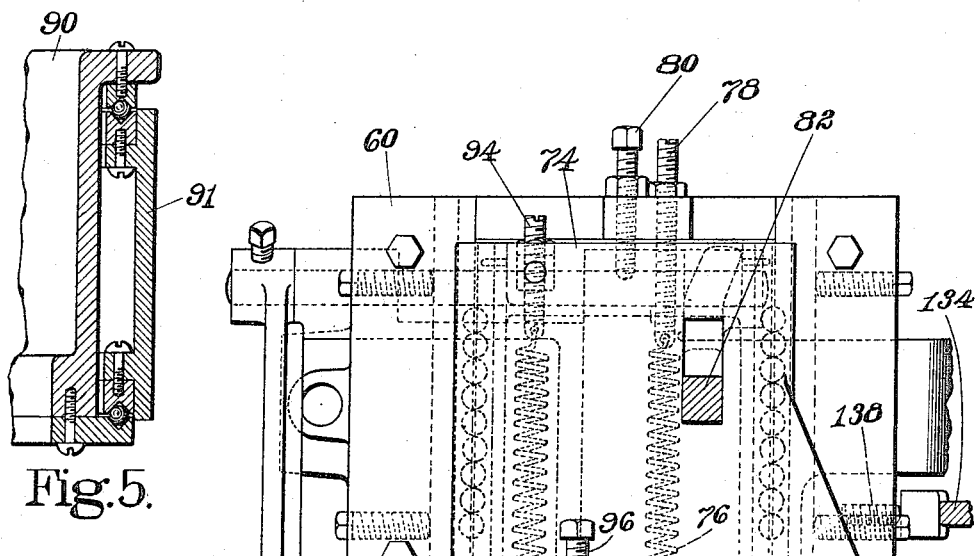
Figure 4:
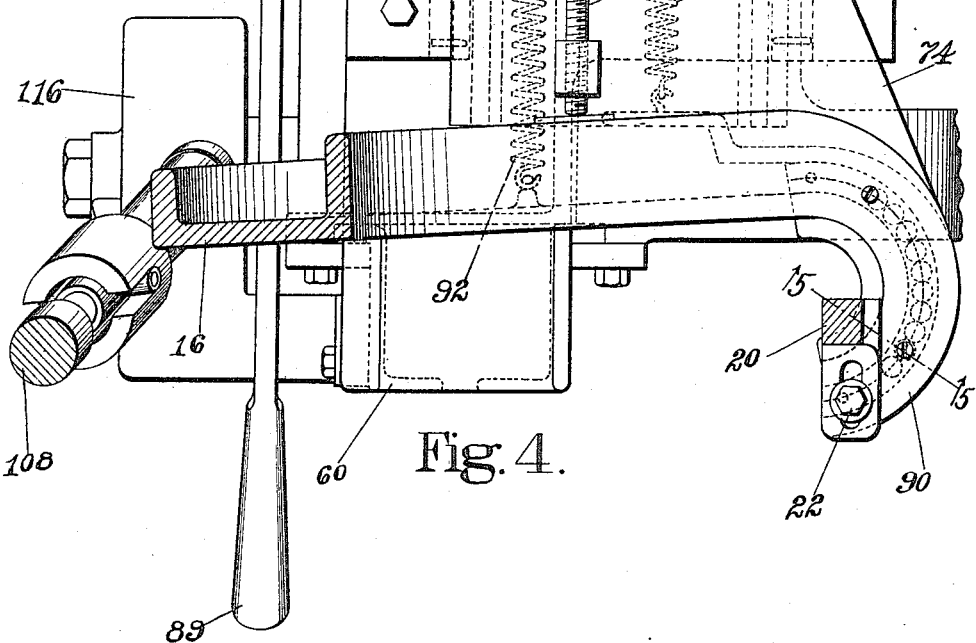

Referring now to the drawings: Figure 1 is a front elevation of a machine embodying this invention; Fig. 2 is an end elevation of the machine shown in Fig. 1; Fig. 3 is a plan view of the machine; Fig. 4 is a horizontal sectional view on line 4—4, Fig. 1, much of the mechanism being shown in plan; Fig. 5 is a cross sectional view on the line 5—5, Fig. 4, and Figs. 6 to 13 inclusive are diagrammatic views showing various positions in which the shoe heel is moved relatively to the cutter and guiding devices for the trimming operation.

The machine shown in the drawings for the purpose of explaining this invention comprises a heel trimming machine of a very common commercial type, extensively used for trimming heels by the hand method above described and known as the Ultima heel trimming machine, and a work support constructed to manipulate the shoe with reference to the cutter of this machine in such a manner as to cause the cutter to trim the entire heel edge.

Substantially the regular commercial construction of the Ultima machine is shown in the drawings, the cutter head and counter guide of this machine being constructed substantially in accordance with the Busell Patent, No. 961,752, granted June 21, 1910. Briefly stated this construction comprises a post 2 on which is mounted a head 4 carrying the stationary bearings for a horizontal shaft 6 (see Fig. 3) that supports the heel trimming cutter 8. The usual rand crease guide or counter guide 10 may be, and preferably is, used on this machine, a spring 12 being provided to back up this guide and hold it yieldingly against the outer end of the cutter. The regular top lift guide preferably is replaced by a special guide indicated at 14, Fig. 3, which consists of an L-shaped plate having a guiding face curved to conform to the path of rotation of the cutter and a shank secured to the adjusting device with which the regular machine is equipped.

The work support comprises a novel shoe clamping mechanism and a novel construction of jack for supporting this mechanism. A bracket 16, forming part of the jack mechanism, has mounted thereon a member 18 that carries the shoe clamping devices; and the parts 16 and 18, together with a rigid bar 20 having a horizontal part clamped to the member 18 and another part curved forwardly and downwardly and clamped to the bracket 16 by a bolt 22, form a yoke-like frame in which the shoe is held by the clamping mechanism. In the vertical part of the bar 20 a top lift supporting plate 24 is mounted on ball bearings for rotation about a horizontal axis. This plate serves as a support for the top lift of the heel of the shoe while it is clamped for the trimming operation.

The shoe clamping mechanism comprises a sleeve 26 which is mounted in bearings in the member 18 for rotative movement and also for sliding movement in the direction of its axis. A plunger 28 is mounted in the sleeve 26 for sliding movement toward and from the top lift supporting plate 24, both the sleeve and plunger being coaxial with the top lift plate. In the end of the plunger nearest the plate 24 a transverse dove-tailed groove is formed to support adjustably a dove-tailed slide carrying a spindle 30 that is adapted to enter the spindle socket of the last on which the shoe to be trimmed is supported. Adjustment of this spindle is effected by means of a screw 32 rotatively mounted in the plunger 28 and having threaded engagement with the slide that supports the spindle 30. By this arrangement the workman is enabled to adjust the spindle 30 so that the center of curvature of the heel of the shoe will be brought into alinement with the axis of the sleeve 26 and top lift plate 24.

The plunger 28 carries an enlargement 34 (see Fig. 3) which is grooved to receive two extensions 36 projecting from the end of the sleeve 26 by which the plunger and sleeve are compelled to rotate together but may move longitudinally with reference to each other. A coiled spring 33 seated in a counterbore in the sleeve 26 bears against the enlargement 34 and tends to force the plunger forward with relation to the sleeve toward the top lift plate 24, this movement of the plunger being limited by a stop collar 35 on the opposite end of the plunger. Two side clamps 37 and 38 are pivoted to opposite sides of the enlargement 34 and have their forward ends shaped to engage and bear upon opposite sides of the counter of the shoe held by the clamping mechanism. In order to cause the members 37 and 38 to bear against and grip the shoe, they have secured thereto heavy leaf springs 39 and 40, respectively, and the free ends of these springs are curved inwardly in position to engage opposite inclined faces 41 and 42, respectively, of the end of the sleeve 26. Motion of these springs toward the side clamps is limited by short set screws threaded through the respective springs.

The clamping movement of the sleeve 26 and plunger 28 is effected by means of a hand lever 44 fulcrumed on the member 18 and connected by a small yoke-shaped link 46, Figs. 2 and 3, to a collar 48 loosely mounted between two collars carried by the sleeve 26, a ball bearing preferably being interposed between the collar 48 and the forward collar of the sleeve to reduce the friction of the parts when the shoe is clamped in the work support.

In order to hold the lever 44 in adjusted position a locking mechanism is provided. This mechanism comprises a stationary arm 49 bolted to the member 18 and curved to conform to the path of travel of a roll 50 that is carried by the lever and runs on the inner surface of the arm. The lever 44 is bifurcated and carries between its branches a friction pawl 52 that is pivoted at such a distance from the arm 49 that its end engages the surface of the arm 49 at a point opposite the roll 50 when it is swung into a position nearly parallel with the lever. It will be evident from an inspection of Fig. 3 that in this position the pawl will prevent any backward movement of the lever. The roll 50 prevents the arm 49 from springing away from the pawl. A releasing device 54, pivoted to the lever 44, is connected with the pawl 52 and has a part extending beside the handle of the lever so that when the handle is grasped the releasing device will be moved in such a direction as to swing the pawl 52 out of engagement with the arm 49. A spring 56 is arranged to act on the releasing device to move it in the opposite direction, causing it to hold the friction pawl in contact with the stationary arm 49 and prevent any backward movement of the lever 44.

From the construction just described it will be understood that when the lever 44 is swung toward the right, as seen in Fig. 3, the plunger 28 will be moved toward the top lift plate 24. Assuming the shoe to be in position to be clamped, the spindle 30 will be entered in the spindle socket of the last and the motion of the plunger will be arrested by the engagement of the plunger end with the top or cone of the last. A further movement of the lever 44 toward the right will move the sleeve 26 relatively to the plunger 28, thus compressing somewhat the spring 33 and causing the inclined faces 41 and 42 of the sleeve to spread apart the outer ends of the springs 39 and 40 and press the side clamps 37 and 38 firmly against opposite sides of the shoe. The lever 44 will be held in this position by the locking mechanism just described. The pressure of the plunger 28 on the last of the shoe can, of course, be varied by the movement of the hand lever 44; but for the purpose of enabling a further adjustment of this pressure to be made, and more particularly to compensate for variations in height of the lasts, the member 18 is made in two parts connected by a dove-tailed joint so that the part carrying the sleeve 26 may be slidingly adjusted toward and from the top lift plate 24. This adjustment is effected by loosening the clamp 57 by which the bar 20 is secured to the member 18, and then turning the adjusting screw 58 which extends loosely through one part of the member 18 but is threaded into the other part. A clamping screw 59 and the clamp 57 secure the two parts in their adjusted position.

It is necessary in order to trim along the edges of the shoe heel to provide means for moving the shoe toward and from the cutter and for moving it past the cutter and the guiding devices to enable the cutter to operate along the heel edge. For this purpose the shoe clamping mechanism is mounted on a jack which comprises a slide 60 mounted in a vertical slideway formed in the frame 62 of the work support. This slide is moved in its slideway by means of a lever 64 (see Fig. 2) fulcrumed on a rock shaft 66 at the back of the machine and having its forward end connected by a link 68 to the slide 60. This lever carries a roll 69 that rests upon a cam 70 secured fast on a shaft 72, which is operated by a mechanism that later will be described to cause it to make one complete revolution and then stop. The rotation of the cam 70 of course causes the lever 64 to swing up and down and consequently moves the slide 60 up and down.

In the upper end of the slide 60 a horizontal slideway is formed in which is mounted on ball bearings a slide 74. This slide, as will be seen from inspection of Figs. 1 and 2, is mounted for movement in a horizontal plane in a direction perpendicular to the direction of motion of the slide 60 and also perpendicular to the shaft 6. A strong spring 76 (see Fig. 4), connected at its forward end to the slide 74 and at its rearward end to an adjustable bolt 78, threaded into the slide 60, tends to pull the slide 74 backwardly toward the left as seen in Fig. 2, and to hold the slide against the end of a bolt 80 that is adjustable in the slide 60 and serves as a stop to limit the rearward movement of the slide 74. Since the horizontal slide 74 carries the bracket 16, previously referred to on which the shoe clamping mechanism is mounted, the spring 76 tends to carry this mechanism and the shoe held thereby toward the cutter 8. In order to move the slide 74 in its slideway, in opposition to the spring 76, an upright lever 82 (see Fig. 2) is secured on a horizontal rock shaft 84 mounted in the back of the machine frame, and carries at its lower end a roll that runs on the surface of a cam 86 fast on the shaft 72. The upper portion of the lever 82 bears against a roll 88 that is carried by the slide 74. The rotative movement of the cam 86 acts on the lever 82 and roll 88 to move the slide 74 forwardly against the tension of the spring 76 and consequently to move the shoe clamping mechanism away from the cutter, the timing of this movement being determined by the shape and angular position of the cam 86 on the shaft 72.

In order to enable the workman to move the shoe quickly away from the cutter as, for instance, in case of accident, a hand lever 89 is secured fast on the rock shaft 84 and is extended out toward the front of the machine within convenient reach of the workman so that by depressing this lever the shaft 84 will be rocked, moving the upper end of the lever 82 forward and operating, through the slide 74 and bracket 16, to carry the shoe clamping mechanism and the shoe away from the cutter.

In many styles of shoes the angle of pitch of the heel is greater at its rear end than at the sides. In trimming heels of such styles it is necessary to tip the heel about an axis lying substantially in the guiding face of the top lift guide, in order to present the shoe properly to the cutter and guiding devices as the pitch angle varies. For this purpose the bracket 16 is provided with an extension 90, (see Figs. 4 and 5) that is curved substantially in the arc of a circle and the horizontal slide 74 is provided with a corresponding extension 91 which supports on ball bearings the extension 90. These extensions are curved about a vertical axis that is adapted to be brought substantially into alinement with the guiding face of the top lift guide 14 during the trimming operation and the shoe clamping mechanism is constructed to support the shoe with the edge of the top lift of the heel substantially in said axis. Consequently when the heel is presented to the cutter with its top lift in contact with the top lift guide 14, the bracket 16 and the shoe clamping mechanism and shoe carried thereby are enabled to swing about the edge of the top lift of the heel, thus enabling the heel to adjust itself to the cutter in accordance with any variations in pitch at successive portions of the heel edge. A spring 92, connected to the bracket 16 and to an adjustable bolt 94 secured in the back of the slide 74, tends to swing the bracket 16 and the shoe clamping mechanism about said axis in such a direction as to move the heel toward the cutter 8 and the counter of the heel toward the counter guard 10. This swinging motion is limited by an adjustable stop bolt 96 that is threaded through a boss formed on the top of the slide 74, the forward end of the bolt being positioned in the path of movement of the bracket 16.

Slight variations in the sizes of the top lifts of the shoes being trimmed will not displace the edge of the top lift from the vertical axis about which the shoe clamping mechanism swings sufficiently to require any adjustment of the shoe in relation to said axis. Where such an adjustment is required, however, it may be obtained by loosening the bolt 22 which passes through a slot in the foot of the bar 20 (see Figs. 3 and 4), and moving this bar relatively to the bracket 16. The opposite end of the shoe clamping mechanism may be similarly adjusted, the member 18 for this purpose being mounted on a dove-tailed slide in the bracket 16 and an adjusting screw 98 being provided to move this slide back and forth with relation to the bracket. A clamping bolt 100 serves to lock the member 18 in an adjusted position on the bracket 16.

The mechanism above described is constructed to present the shoe heel to the cutter and to move the heel past the cutter sufficiently to cause the cutter to trim the sides of the heel. For the purpose of trimming the curved part of the heel at its rear end it is necessary to turn the heel relatively to the cutter. Mechanism, therefore, is provided for rotating the shoe clamping devices to cause them to turn the heel through an angle of 180 degrees. This mechanism comprises a beveled gear 102, Fig. 3, mounted in the member 18 and splined to the sleeve 26, and a corresponding gear 104 also mounted in said member 18 meshing with the gear 102 and driven by a flexible shaft. This shaft consists of a main part 106, a section 108 telescoping therewith, a universal joint 110 by which the section 108 is connected to the gear 104 and another universal joint 112 connecting the part 106 to a bevel gear 114. This gear is mounted in a gear casing 116, Fig. 2, that is bolted to the side of the vertical slide 60. The gear 114 meshes with a sector 118 which is pivoted on a shaft 120 carried by the casing 116. This sector carries a roll 122 that is positioned in a vertical cam track 124 formed in a plate 126 (see Figs. 1 and 2) which is bolted to the side of the stationary jack frame 62. When the slide 60 is raised by the mechanism above described it will carry with it the casing 116 and the gears 114 and 118, thus causing the roll 122 to travel upwardly in its cam track 124. When the roll travels along the curved part of its cam track it will cause the sector 118 to swing in a clockwise direction about its pivot 120, as seen in Fig. 2, which in turn will rotate the beveled gear 114 and will cause the gears 104 and 102 to rotate the shoe clamping devices and the shoe held thereby through an angle of 180 degrees. Upon the downward movement of the slide 60 a reverse rotation of the shoe holding devices will be effected.

In presenting the shoe heel to the cutter and guiding devices it is important to have the counter or rand crease guide 10 properly positioned in the rand crease of the shoe preparatory to the trimming operation. This invention provides a novel mechanism for causing this guide to be positioned automatically in the rand crease. This mechanism consists of a rod 130, Fig. 3, mounted in the machine frame to slide in a direction parallel to the shaft 6, an arm 132 clamped adjustably to said rod and having a pin and slot connection with the shank of the guard 10 and an operating lever 134 for the rod 130. This lever is fulcrumed on a stationary part of the machine frame at 136. It has a curved lower end positioned in the path of movement of a bolt 138 adjustably threaded into the upper part of the slide 60, (see Figs. 1 and 4). When the slide 60 is in its lowermost position preparatory to placing the shoe in the work support for the trimming operation, the bolt 138 is pressed against the lower end of the lever 134 and causes this lever to hold the counter guide 10 away from the end of the cutter, as seen in Fig. 3. As the slide 60 rises to present the heel of the shoe to the cutter for the trimming operation, the bolt 138 continues to operate through the lever 134 to hold the counter guide away from the cutter until the counter of the shoe is about to contact with the guide 10, when the bolt 138 is moved out of contact with the lever 134; whereupon the spring 12 forces the counter guide back toward the cutter and causes it to rest upon the projecting margin of the heel seat end of the sole. The guide is then in position to guide the shoe for the trimming operation. This arrangement causes the guide to find the rand crease of the shoe and to be positioned therein automatically notwithstanding variations, within certain limits, of course, in the height of the heels of the shoes being trimmed.

The driving mechanism for the shaft 72 consists of a worm gear 140, Fig. 2, fast on said shaft and meshing with a worm 142 fast on a shaft 144 and carrying a pulley 146 to which power is supplied from any convenient source. The bearing frame 148 for the shaft 144 is mounted to rock slightly about a pivot 150, to carry the worm 142 into or out of mesh with the gear 140. The movement of the bearing frame is controlled by a toggle 152 consisting of a link connected to the bottom of the frame 148 and a bell crank lever fulcrumed on the machine frame at 154 and joined to the link 152 in such a manner that the toggle is permitted to collapse in one direction and to move from such collapsed position into a position only slightly beyond its straightened position in the opposite direction. A rod 156, pivoted to the arm of the bell crank lever opposite the arm connected to the link, is connected to a treadle 158, a spring 160 being provided to hold the treadle normally in a raised position. It will be evident from an inspection of this arrangement as shown in Fig. 1, that when the treadle is depressed the toggle will be straightened, thus raising the worm 142 into mesh with the worm gear 140. The weight of the parts will tend to hold the toggle in its straightened condition with the worm in mesh with its gear. As above stated this mechanism is arranged to cause the shaft 72 to make one complete revolution and then stop. For this purpose an upright lever 162 is fulcrumed on the forward end of the movable frame 148 with its upper end extending into the path of a pin 164 that projects from the side of the gear wheel 140. In the lower end of this lever a bolt 166 is adjustably mounted with its end in position to strike the middle joint of the toggle 152 and move it in a direction to collapse the toggle. Consequently when the pin 164 strikes the upper end of the lever 162 it causes this lever to swing in a clockwise direction about its fulcrum, thus pressing the bolt 166 against the toggle 152. This causes the toggle to break or collapse and causes the worm 142 to drop away from the gear 140. The inertia of the parts stops any further rotation of the shaft 72. The downward motion of the frame 148 carries the upper end of the lever 162 below the level of the pin 164, whereupon it is swung in a counter-clockwise direction about its fulcrum by means of a spring 168. The upper end of the lever 162 is beveled so that when the treadle 158 is again depressed to raise the frame 148 and start the machine into operation this beveled end of the lever will come up behind the pin 164, the contact of the lever with the pin merely causing the lever to swing still further in a counter-clockwise direction until the pin is moved out of engagement with the lever. This lever is then in position to be operated again by the pin 164 to break the toggle and stop the operation of the machine.

Figure 6:
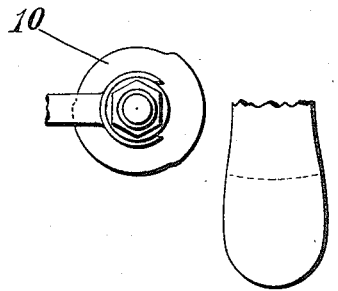
Figure 7:
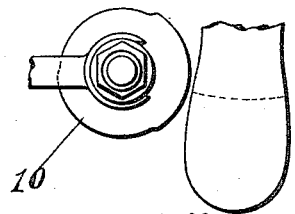
Figure 8:
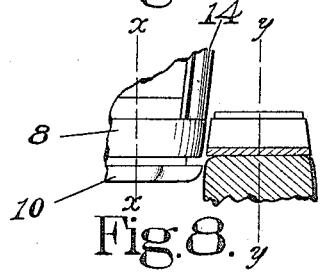

The operation of the machine is as follows:—The position of the last spindle 30 is adjusted by means of the screw 32 so that, when the shoe is clamped in the work support, the center of curvature of the heel will be substantially in the axis of the plunger 28 and the top lift plate 24. The shoe clamping devices and the frame in which they are supported are adjusted bodily by means of the adjusting screw 98 and bolt 22 to so position these parts that, when the shoe is clamped in position for the trimming operation, the edge of its top lift will be substantially in the axis about which the bracket 16 and shoe clamping mechanism swing. The shoe is then placed in the machine, the spindle 30 being positioned in the spindle socket of the last and the top lift of the shoe resting on the top lift plate 24, and the lever 44 is moved forward to clamp the shoe securely in place in the manner previously described. The shoe is initially positioned for this operation with its toe pointing upwardly, as indicated in Figs. 1 and 6, and the heel of the shoe at this time occupies substantially the location with reference to the cutter and guiding devices in which it is indicated diagrammatically in Fig. 6. The shoe is thus positioned normally in substantially parallel relation to the axis of the cutter or, in other words, with the plane of the heel substantially perpendicular to the axis of the cutter. After the shoe is clamped in this manner in the work support, the workman depresses the treadle 158 which operates through the mechanism hereinbefore described to start the shaft 72 into rotation. This movement operates through the cam 70 and lever 64 to raise the slide 60; while, at the same time, the cam 86 and lever 82 permit the spring 76 to move the slide 74 backwardly, these two motions combining to carry the heel of the shoe upwardly and inwardly toward the cutter, as indicated in Fig. 7. During the first part of this movement of the shoe the bolt 138 and lever 134 operate through the parts 130 and 132 to hold the rand crease guide 10 away from the end of the cutter; but as the top lift is about to move into contact with the top lift guide 14, and as the counter of the shoe is about to engage the rand crease guide 10, the lever 134 is released by the bolt 138, and the spring 12 moves the guide toward the cutter until it strikes the projecting part of the rand or heel seat end of the outsole of the shoe. A further inward movement of the shoe causes the edge of the guide to enter the rand crease of the shoe. Fig. 8 shows the relative positions of these parts as the guide 10 is moving axially of the cutter shaft 6 and toward the cutter while the shoe is moving transversely of the cutter shaft and toward the cutter. The timing of these operations and the position at which the guide 10 will be engaged by the shoe can, of course, be varied by the adjustment of the bolt 138 and the adjustment of the part 132 on the rod 130.

Figure 9:
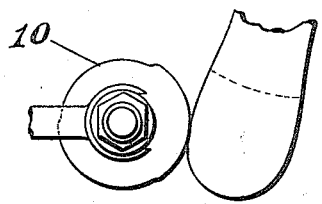
Figure 10:
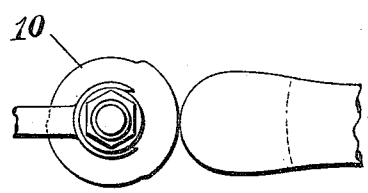
Figure 11:
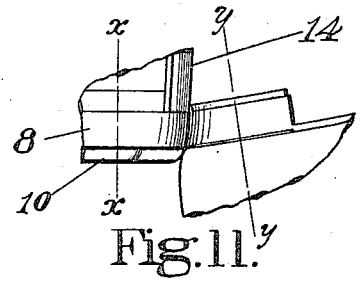
Figure 12:
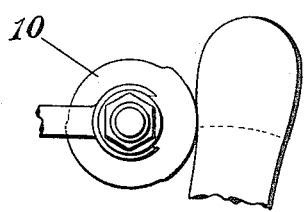
Figure 13:
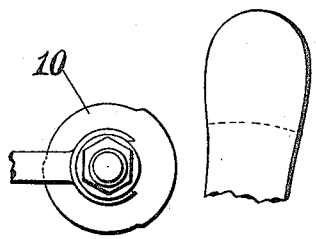

As soon as the upper breast corner of the heel comes in contact with the cutter, the trimming operation begins; and this operation usually starts before the edge of the top lift has come into contact with the top lift guide 14 and before the edge of the rand crease guide 10 has settled firmly into the rand crease of the shoe; but, as the cutter 8 trims away the surplus material from the side of the heel at the breast corner, the springs 76 and 92 will operate through the shoe holding devices to pull the shoe laterally against the guides 14 and 10 so that, within a fraction of a second after the cutter has begun the trimming operation, the top lift and counter of the shoe will be properly seated in contact with their respective guides and will thereafter be held yieldingly in such contact by the springs 76 and 92 until the trimming operation has been completed. After the initial presentation of the shoe heel to the cutter and guiding devices, the jack continues to move the shoe upwardly past the cutter to enable the cutter to trim along the side of the heel, the cam 86 having at this time moved out of engagement with its lever 82 so that it exerts no influence on the position of the horizontal slide 74, the movements of this slide being controlled by the spring 76 and by the contact of the work with the guides. When the cutter arrives at the curved part of the shoe heel, the slide 60 will be moved up to such a point that the roll 122 of the rotating mechanism for the shoe clamp will begin to travel along the curved portion of its cam track 124. The motion imparted to the sector 118 by the travel of the roll 122 in its cam track will be transmitted through the bevel gear 114 and the flexible shaft 106 to the gears 104 and 102, causing them to rotate the shoe clamping mechanism and, consequently, to rotate the shoe held thereby. The side clamps 37 and 38 have a firm grip on the shoe and through them the turning movement of the shoe clamping mechanism is transmitted to the shoe. The turning movement imparted to the shoe in this manner is produced by the rise of the jack which continues to carry the shoe upwardly past the cutter and guiding devices so that the heel will be turned through the positions in which it is shown in Figs. 9 and 10, causing the trimming operation to proceed around the rear end of the heel. During this movement of the shoe the point of operation of the cutter is transferred from a part of the heel that ordinarily is nearly straight or has no pitch, to a point at the rear end of the heel where usually there is more or less pitch or slant forward of the heel edge. The springs 76 and 92, of course, keep the top lift and counter of the shoe pressed firmly against the guiding surfaces of the respective guides 14 and 10, but this change in pitch causes the shoe to swing the shoe clamping mechanism and the bracket 16 that supports it about the axis of curvature of the part 90 of the bracket and against the tension of the spring 92. This axis at this time is in line with the guiding face of the top lift guide 14 and also, of course, with the part of the edge of the top lift that bears against this guiding face at this instant, so that the shoe actually swings on the edge of the top lift. The amount of this swing, of course, will vary with the amount of pitch of the heel. In Fig. 8, which shows the relative positions of the cutter and shoe just before the trimming operation begins, it will be noted that the line $x$—$x$, which indicates the axis of the cutter, and the line $y$—$y$, which indicates the axis of revolution of the shoe, are substantially parallel; while in Fig. 11, which shows the cutter operating at the extreme rear end of the heel, the line $y$—$y$ has swung until it makes a considerable angle with the line $x$—$x$. This angle indicates the amount of swing which it is necessary for the shoe to make in order to accommodate the change in pitch between the breast corner and the rear end of the heel. The flexibility of the shaft 106 and its telescoping construction enable it to transmit the rotative movements to the shoe clamping mechanism, while permitting this mechanism to swing in the manner just described. The shoe clamping mechanism continues to turn and the jack continues to move upwardly until the entire curved portion of the heel is trimmed when the turning motion of the shoe clamp stops while the jack continues to carry the shoe upwardly past the cutter until the trimming operation is completed. At this time the parts assume substantially the relationship in which they are shown in Fig. 12. As the jack continues to rise the cam 86 operates through the lever 82 to move the slide 74 forward and thus to carry the shoe away from the cutter into substantially the position in which it is shown in Fig. 13. Thereafter the shoe is held away from the cutter by the cam 86 while the slide 60 descends to substantially its initial position. During this downward movement of the jack the shoe is rotated through an angle of 180 degrees in a direction opposite to its previous direction of rotation; so that, when the operation of the machine is completed, the shoe has returned (as shown in Fig. 1) to the same position that it occupied before the trimming operation began. At this time the pin 164 on the worm gear 140 operates the lever 162 and causes it to stop the machine by collapsing the toggle 152. Fig. 2 of the drawings shows the pin 164 as it comes into contact with the lever 162 for the purpose of stopping the machine.

The shoe is released from the grip of the clamping mechanism by operating the releasing device 54 and swinging the handle 44 backwardly. The next shoe to be trimmed is then placed in the machine and the operations above described are repeated.

If it is desired to interrupt the trimming operation at any time, as for instance in case of accident, this result may be effected by depressing the hand lever 89 which, through the mechanism previously described, will move the slide 74 forward against the tension of the spring 76, thus immediately moving the heel of the shoe being trimmed out of contact with the cutter. This control of the engagement of the heel with the cutter is also of great convenience in changing the adjustment of the machine to accommodate a style of heel different from that previously trimmed, since it enables the workman to make most of the adjustments with the heel clamped in its operative position and then to control the engagement of the heel with the cutter as the machine goes through its cycle of operations to test this adjustment.

After the heel trimming operation just described has been completed, the rand is trimmed in the usual manner on any of the common randing or heel seat trimming cutters; or, if desired, the work support of this invention may be used in connection with a cutter head that simultaneously trims the heel and the rand or heel seat of the shoe.

It will be readily appreciated that this invention is applicable to machines designed to perform other operations on the shoe than that of trimming the heel, and that other tools for performing finishing operations on the heel might be substituted for the rotary cutter shown in the drawings without departing from the spirit of this invention. It will be understood, therefore, that while a cutter is specifically mentioned as the operating tool in the above description and in the claims, this tool is referred to by way of example rather than limitation.

Having thus described my invention, what I claim as new and desire to secure by Letters Patent of the United States is:—

1. In a heel trimming machine, the combination with a heel trimming cutter and a slidably mounted rand crease guide therefor, of a work support, mechanism for relatively moving said support and cutter to present the heel of a shoe mounted in said support to the action of said cutter to cause the heel to be trimmed, and mechanism arranged to operate in time relation to said relative movement of the support and the cutter for relatively moving said guide and shoe preparatory to the trimming operation to cause said guide to be positioned automatically in the rand crease of the shoe notwithstanding variations in the height of the heels of the shoes being trimmed.

2. In a heel trimming machine, the combination with a heel trimming cutter and a rand crease guide therefor confined against movement transverse to the axis of the cutter, of a work support, mechanism for relatively moving said support and cutter to present the heel of a shoe mounted in said support to the action of said cutter to cause the heel to be trimmed, and mechanism arranged for operation during said relative movement of the support and the cutter for relatively moving said guide and shoe in a direction substantially parallel to the axis of said cutter to cause said guide to be positioned in the rand crease of the shoe preparatory to the trimming operation.

3. In a heel trimming machine, the combination with a heel trimming cutter and a rand crease guide therefor, of a work support, mechanism for relatively moving said support and cutter to cause the cutter to trim the heel of a shoe mounted in said support, and mechanism controlled by the work support for moving said guide relatively to the shoe to cause it to be positioned in the rand crease of the shoe preparatory to the trimming operation.

4. In a heel trimming machine, the combination with a rotary cutter, a shaft supporting said cutter, stationary bearings in which said shaft is mounted, and a rand crease guide for said cutter, of a work support, mechanism for moving said support to present the heel of a shoe mounted therein to said cutter for the trimming operation, and controlling mechanism for said rand crease guide arranged to be operated by said movement of the work support to cause the guide to enter the rand crease of a shoe before the trimming operation is begun.

5. In a heel trimming machine, the combination with a heel trimming cutter and a shoe support, of power operated mechanism for relatively moving said support and cutter to cause the heel to be presented to said cutter and to be trimmed by said cutter, and controlling means for enabling the workman to interrupt the engagement of the heel and cutter at any stage of the trimming operation.

6. In a heel trimming machine, the combination with a rotary cutter and a shoe support, of power operated mechanism for moving said support to present the heel to said cutter and to cause said cutter to trim the edge of the heel, and controlling means for said support arranged to enable the workman to move said support away from the cutter at any stage of the trimming operation to interrupt the engagement of the heel and cutter.

7. In a heel trimming machine, the combination of a rotary cutter and guiding devices mounted adjacent to said cutter, of a shoe clamping mechanism, a jack supporting said mechanism, means for operating said jack to present the heel supported by said clamping mechanism to said cutter and guiding devices and to cause the cutter to trim the edge of the heel, means acting yieldingly through said jack to hold the heel in contact with said cutter and guiding devices, and controlling means operable by the workman for overcoming the action of said yielding means at any stage of the trimming operation to move the heel away from the cutter.

8. In a heel trimming machine, the combination with a rotary cutter, a shaft supporting said cutter, and stationary bearings for said shaft, of a shoe clamping mechanism, a jack supporting said mechanism, power operated means for moving said jack to present the shoe held by said clamping mechanism to said cutter and to move the shoe past the cutter to cause the cutter to trim the sides of the shoe heel, and mechanism controlled by the jack acting through said clamping mechanism to turn the shoe to cause the cutter to trim around the end of the heel.

9. In a heel trimming machine, the combination with a rotary cutter, of a shoe clamping mechanism, a jack supporting said mechanism, power operated means for moving said jack to carry the shoe held by said clamping mechanism past the cutter to cause the cutter to trim along the edge of the heel, and means acting through said clamping mechanism and operated by said movement of the jack to turn the shoe to cause the cutter to trim around the end of the heel.

10. In a heel trimming machine, the combination with a rotary cutter, of a shoe clamping mechanism, a jack supporting said mechanism, means for moving said jack to present the shoe held by said clamping mechanism to said cutter and to move the shoe past the cutter to cause the cutter to trim the sides of the heel, a flexible shaft for rotating said shoe clamping mechanism, and means for rotating said shaft to cause said clamping mechanism to turn the shoe for the trimming of the rear end of the heel.

11. In a heel trimming machine, the combination with a rotary cutter, of a shoe clamping mechanism, a jack supporting said mechanism, means for moving said jack to present the shoe held by said clamping mechanism to said cutter and to move the shoe past the cutter to cause the cutter to trim the sides of the heel, a telescoping universally-jointed shaft connected with said clamping mechanism to turn said mechanism, and means for rotating said shaft to cause said clamping mechanism to turn the shoe to enable the cutter to trim the rear end of the heel.

12. In a heel trimming machine, the combination with a rotary cutter, of a shoe clamping mechanism, a jack supporting said mechanism, means for moving said jack to carry the shoe held by said clamping mechanism past the cutter to cause the cutter to trim along the edge of the heel, a shaft for rotating said clamping mechanism to enable the cutter to trim around the end of the heel, and cam operated means for causing said shaft to be rotated by said movement of the jack for the purpose described.

13. In a heel trimming machine, the combination with a rotary cutter, a shaft supporting said cutter, and stationary bearings for said shaft, of guiding devices comprising a toplift-engaging member mounted adjacent to said cutter, a shoe support, means acting on said support to move the heel held thereby past the cutter to cause the heel to be trimmed, means acting through said support to hold the heel yieldingly in contact with said cutter and guiding devices during the trimming operation, and means for overcoming the action of said yielding means to move the heel away from the cutter.

14. In a heel trimming machine, the combination with a rotary cutter, a shaft supporting said cutter, and stationary bearings for said shaft, of a shoe support arranged initially to present the heel of the shoe laterally to the cutter, means acting through said support to move the heel of the shoe mounted therein bodily past the cutter and to turn the shoe to cause said cutter to trim the entire heel edge, means acting yieldingly through said support to hold the heel in contact with said cutter, and means acting automatically to overcome the action of said yielding means to move the heel away from the cutter after the trimming operation has been completed.

15. In a heel trimming machine, the combination with a rotary cutter and a toplift guide for said cutter, of a shoe support arranged to enable the shoe to swing during the trimming operation about an axis substantially in line with the guiding face of said toplift guide to enable the heel to be adjusted to the cutter in accordance with variations in the pitch of the heel, said shoe support being constructed to support a shoe with the edge of its toplift substantially in said axis, mechanism acting through said shoe support to move the shoe to cause the cutter to trim from one breast corner around the end to the opposite breast corner, and means acting yieldingly through said shoe support to swing the heel about said axis toward said cutter.

16. In a heel trimming machine, the combination with a rotary cutter and a toplift guide therefor, of a shoe clamping mechanism, a jack in which said mechanism is mounted to enable the shoe to swing during the trimming operation about an axis substantially in line with the guiding face of said toplift guide, said mechanism being constructed to support a shoe with the edge of its toplift substantially in said axis, said jack supporting said mechanism for movement toward and from said cutter, and yielding means acting through said jack to move said shoe bodily toward said cutter and to swing said shoe about said axis toward said cutter.

17. In a heel trimming machine, the combination with a rotary cutter and a toplift guide therefor, of a shoe clamping mechanism, and a jack in which said mechanism is mounted for movement toward and from said cutter and to enable the shoe to swing during the trimming operation about an axis substantially in line with the guiding face of said toplift guide, said clamping mechanism being constructed to support a shoe with the edge of its toplift substantially in said axis and being adjustable transversely of said axis to accommodate heels of different widths.

18. In a heel trimming machine, the combination with a rotary cutter and a toplift guide therefor, of a work support comprising a shoe clamp and mechanism supporting said clamp for movement in a direction to present the heel to said cutter and in an opposite direction to move the heel away from said cutter after the trimming operation has been completed, said supporting mechanism comprising means for enabling the clamp to move toward and from said cutter in a direction transverse to the direction of said presenting movement, and also to swing about an axis substantially in line with the guiding face of said toplift guide.

19. In a heel trimming machine, the combination with a rotary cutter, a toplift guide therefor and a horizontal shaft supporting said cutter, of a work support having a vertical slide, a horizontal slide mounted thereon, a bracket mounted in said horizontal slide to swing during the trimming operation about a vertical axis substantially in line with the guiding face of said toplift guide, a shoe clamp supported by said bracket to rotate about a horizontal axis and arranged to support a shoe with the edge of the toplift substantially in said vertical axis, and mechanism for operating said slides and clamp to present the heel to the cutter and to cause the cutter to trim the heel edge from one breast corner around the end to the opposite breast corner.

20. In a heel trimming machine, the combination with a rotary cutter, of a shoe support comprising means to hold a shoe for the heel trimming operation, and mechanism acting through said support to move the shoe to cause the cutter to trim the heel edge from one breast corner around the end to the opposite breast corner, said support being constructed to hold the shoe normally in a position substantially parallel with the axis of said cutter, but arranged to enable the shoe to swing yieldingly to accommodate changes in pitch of the heel.

21. In a heel trimming machine, the combination with a rotary cutter, of a shoe clamping mechanism, said clamping mechanism having means to grip the counter of the shoe at opposite sides, a jack rotatably supporting said mechanism, means for moving said jack to carry the shoe held by said mechanism past the cutter to cause the cutter to trim along the edge of the heel, and means operating through said clamping mechanism to turn the shoe to cause said cutter to trim around the end of the heel.

22. In a heel trimming machine, the combination with a rotary cutter, of a work supporting mechanism for holding the shoe for the operation of said cutter on the shoe heel, said mechanism comprising a support for the tread face of the heel, a plunger arranged to bear on the cone of the last in the shoe being trimmed to clamp the heel against said support, side clamps arranged to bear on opposite sides of the counter of said shoe, operating means for said plunger and clamps, and mechanism for supporting said plunger and clamps for rotative movement about the axis of said plunger.

23. In a heel trimming machine, the combination with a rotary cutter, of a work supporting mechanism for holding the shoe for the operation of said cutter on the shoe heel, said mechanism comprising a support for the tread face of the heel, a plunger arranged to bear on the cone of the last in the shoe being trimmed to clamp the heel of the shoe against said support, two side clamps pivotally connected to said plunger and arranged to bear against opposite sides of the counter of the shoe, and means for yieldingly forcing said plunger toward said support and for applying pressure yieldingly to said side clamps.

24. In a heel trimming machine, the combination with a rotary cutter, of a shoe supporting mechanism for holding the shoe for the heel trimming operation comprising a support for the tread face of the heel, a plunger arranged to bear on the cone of the last in the shoe being trimmed to press said last toward said support, and side clamps constructed to be operated by the movement of the plunger toward said support to grip opposite sides of the shoe.

25. In a heel trimming machine, the combination with a heel trimming cutter and a slidably mounted rand crease guide, of a work support movable to carry a shoe into position to cause the heel of the shoe to be trimmed by said cutter, and means arranged to be operated in time relation to said movement of the support for relatively moving the guide and the shoe to cause the guide to enter the rand crease of the shoe.

26. In a heel trimming machine, the combination with a heel trimming cutter and a rand crease guide, of a work support movable to carry a shoe into position to cause the heel of the shoe to be trimmed by said cutter, and means controlled by said movement of the shoe support for moving the rand crease guide relatively to the shoe to cause the guide to enter the rand crease.

27. In a heel trimming machine, the combination with a heel trimming cutter and a rand crease guide, a support for said guide, of a work support movable to carry a shoe into position to cause the heel of the shoe to be trimmed by said cutter, means for positioning the rand crease guide when idle at a distance from the end of the cutter, and means for moving said guide toward the cutter as the shoe is brought into position to be trimmed.

28. In a heel trimming machine, the combination with a heel trimming cutter and a rand crease guide, of a work support movable to carry a shoe into position to cause the heel of the shoe to be trimmed by said cutter, connections between said support and the rand crease guide for positioning said guide when idle at a distance from the end of the cutter, and yielding means for moving the guide toward the cutter to cause it to enter the rand crease of the shoe as the shoe is brought into position to be trimmed.

In testimony whereof I have signed my name to this specification in the presence of two subscribing witnesses.

FRANK W. BLANCHARD.

Witnesses:
JOHN H. MCCREADY,
NELSON B. TODD.

Copies of this patent may be obtained for five cents each, by addressing the "Commissioner of Patents, Washington, D. C."